United States Patent

[11] 3,618,723

[72] Inventor John C. McPherson
 Philadelphia, Pa.
[21] Appl. No. 877,744
[22] Filed Nov. 18, 1969
[45] Patented Nov. 9, 1971
[73] Assignee Eaton Yale & Towne Inc.
 Cleveland, Ohio

[54] TRANSMISSION CLUTCH CONTROL
 31 Claims, 5 Drawing Figs.
[52] U.S. Cl. .................................................. 192/51,
 74/DIG. 11, 91/444, 91/448, 91/459, 91/461,
 192/87.19
[51] Int. Cl. ...................................................F16d 25/10,
 F15b 11/12, F15b 13/044
[50] Field of Search........................................... 91/444,
 448, 459, 461; 192/51, 87.19, 87.18; 180/53 DC;
 74/DIG. 11, DIG. 2

[56] References Cited
UNITED STATES PATENTS

| 2,188,279 | 1/1940 | Hey | 192/87.19 X |
| 2,313,438 | 3/1943 | Hoelscher | 91/448 X |
| 2,968,967 | 1/1961 | Ross, Jr. | 74/DIG. 2 |
| 3,199,647 | 8/1965 | Staab | 192/87.19 |
| 3,220,318 | 11/1965 | McGuire | 91/461 |
| 3,527,328 | 9/1970 | Maurice | 192/87.19 X |

FOREIGN PATENTS

| 900,470 | 7/1962 | Great Britain | 180/53 DC |

Primary Examiner—Allan D. Herrmann
Attorney—Teagno & Toddy

ABSTRACT: In a hydraulic transmission, the movement of the directional valve into its neutral position automatically effects movement of a control valve to relieve the transmission forward and reverse clutches of hydraulic pressure. When the directional valve is thereafter moved to forward or reverse, hydraulic pressure is applied to one of the clutches but at a controlled rate through automatic metered movement of the control valve. The control valve may also be moved manually so as to contribute inching.

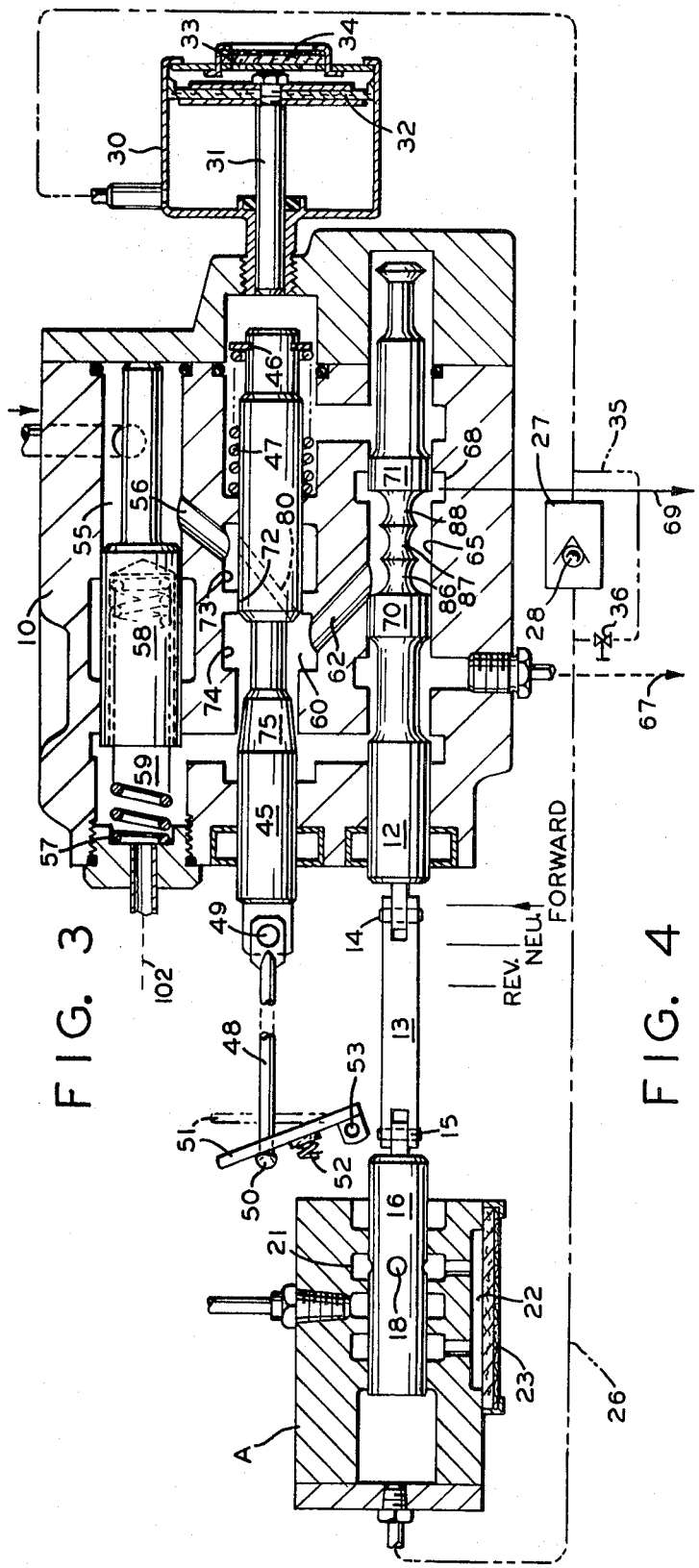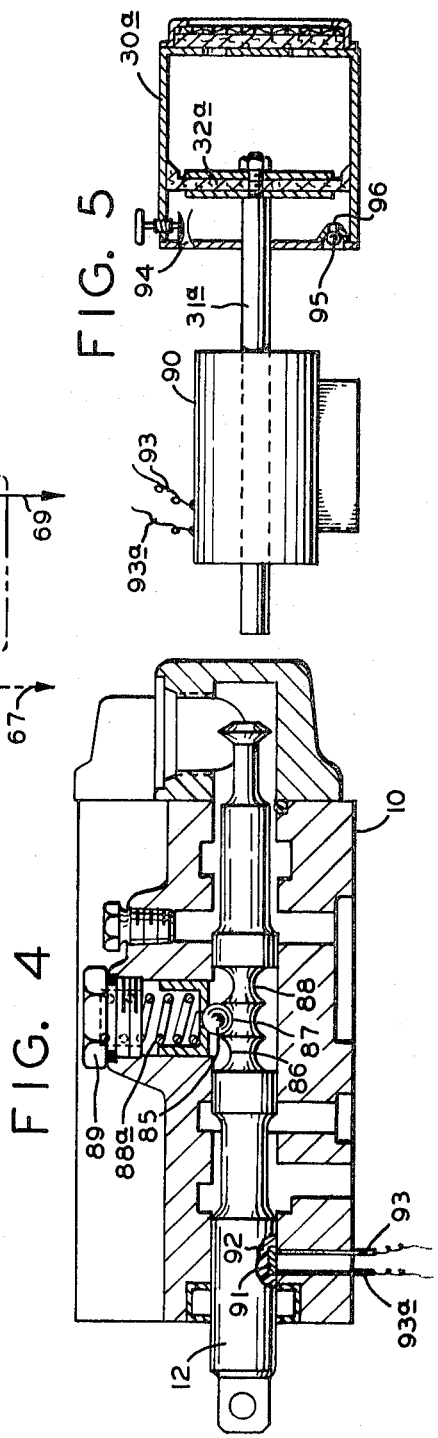

.# 3,618,723

TRANSMISSION CLUTCH CONTROL

BACKGROUND OF THE INVENTION

This invention relates to a hydraulic transmission, and more particularly, to the control of the clutches of a hydraulic transmission. Those skilled in the art are aware of the fact that the swift movement of hydraulic fluid to the clutches of a hydraulic transmission, will cause the vehicle in which the transmission is used, to jerk forward or rearward because of the swift engagement of the clutches. In an industrial vehicle, such movement may be very damaging both to the vehicle, the operator, or the goods that are being transported by the vehicle. My invention contemplates the use of means for preventing the swift movement of fluid to the forward and rearward clutches of a hydraulic transmission, in order to effect smooth acceleration and to prevent jerky and swift movement of a vehicle equipped with the transmission.

Workers in the art appreciate also that in a hydraulic transmission of the class described, it is highly desirable that the operator be prevented from changing the direction of the vehicle from forward to reverse or vice versa, while the vehicle is moving in a particular direction. The art terms this form of changing the direction of a moving vehicle "plugging." Plugging is a procedure that is frowned upon, as considerable damage may be caused by thus changing the direction of the moving vehicle. My invention contributes an antiplugging feature that is inherent in the construction that functions to prevent the swift application of the hydraulic fluid to the directional clutches.

It is exceedingly important that the operator of a vehicle of the class utilizing a hydraulic transmission be able to control the forward and reverse clutches in order to permit a procedure that the art terms "inching." Inching is a procedure that permits racing of the engine of a vehicle, while permitting the clutches to slip so that the vehicle will move very slowly. Such inching is exceedingly important in order to move a vehicle slowly uphill into a particular location, or to elevate a load-lifting platform through swift operation of a hydraulic pump mechanism, operated by the same engine that drives the vehicle, while at the same time the vehicle moves forward slowly through a slipping of the clutches. It is possible in my construction conceived for preventing swift application of the forward and reverse clutches, and also to prevent plugging, to permit inching without requiring complex additional means. As a matter of fact, the inching procedure is inherent in my invention and is obtained through the simple utilization of an inching pedal connected to a part of the hydraulic clutch mechanism by relatively conventional means.

PRIOR ART

While all the various functions of my invention to be described in this application may have been contributed individually by various mechanisms, so far as I know, it has never been possible, through the development of a single basic concept, to contribute inching, antiplugging, and slow metered application of hydraulic fluid to clutches utilizing a construction in which the three functions are inherent.

SUMMARY OF INVENTION

As a feature of my invention I prevent the swift application of fluid to the forward and reverse clutches of a hydraulic mechanism through the utilization of a control for the flow of the hydraulic fluid to the clutches, that is adapted inherently to prevent swift flow of the hydraulic fluid to the clutches when the directional valve that determines whether or not fluid flows to the forward clutch or to the reverse clutch, is moved into a directional position from a neutral position.

As a particular feature of the invention, I utilize means for moving a control device, which may take the form of a valve, into a position in which application of hydraulic fluid pressure to the clutches ceases whenever the directional valve is placed in a neutral position. In one form of my invention this may be accomplished through connecting a control valve to means actuated by the vacuum generated by the engine. The movement of the directional valve thereafter into a directional position is effective to allow a gradual dissipation of the vacuum so that there will be a gradual increased application of hydraulic fluid pressure to the directional clutches.

In another form of the invention, the movement of the directional valve to neutral excites an electromagnet for moving a fluid control valve to withdraw hydraulic fluid pressure flow from the clutches. Upon the breaking of the circuit of the electromagnet, as when the directional valve is moved into a directional position, the control valve will gradually move slowly, as under the control of a dashpot, allow the full application of hydraulic fluid pressure to the directional clutches.

It will be well appreciated, that since fluid pressure is dissipated by the control valve whenever the directional valve is in a neutral position, my construction is inherently antiplugging. Thus, the directional valve must move through neutral when it moves from one directional position to the other. Since, when it is in neutral position, fluid pressure flow to the clutches cannot take place effectively, there must be a relieving of the clutch pressure and the clutches will become disengaged. Thereafter, fluid pressure at the clutches will increase only at a graduated predetermined rate.

The inching control is also inherent except for the addition of a treadle. Thus, through moving the control valve by the treadle, the valve is caused to function in the same manner as if moved by the electromagnet or by the vacuum of the engine to dissipate the flow of fluid pressure to the clutches. This movement of the control valve may be accomplished when the clutches are in forward or reverse drive position, so that the drive will be through slipping clutches, thereby contributing inching. Again, it is emphasized that this feature is practically inherent in the basic combination of my invention.

DESCRIPTION OF DRAWINGS

Referring now to the drawings:

FIG. 3 is a view similar to FIGS. 1 and 2, but showing the directional valve in forward position and the control valve moved by the inching treadle.

FIG. 4 is a section illustrating a detent mechanism for holding the directional valve yieldingly in three positions, together with an electrical control. FIG. 5 shows an electromagnet and dashpot of the electrical control.

DESCRIPTION OF PREFERRED EMBODIMENTS

Figure 1:
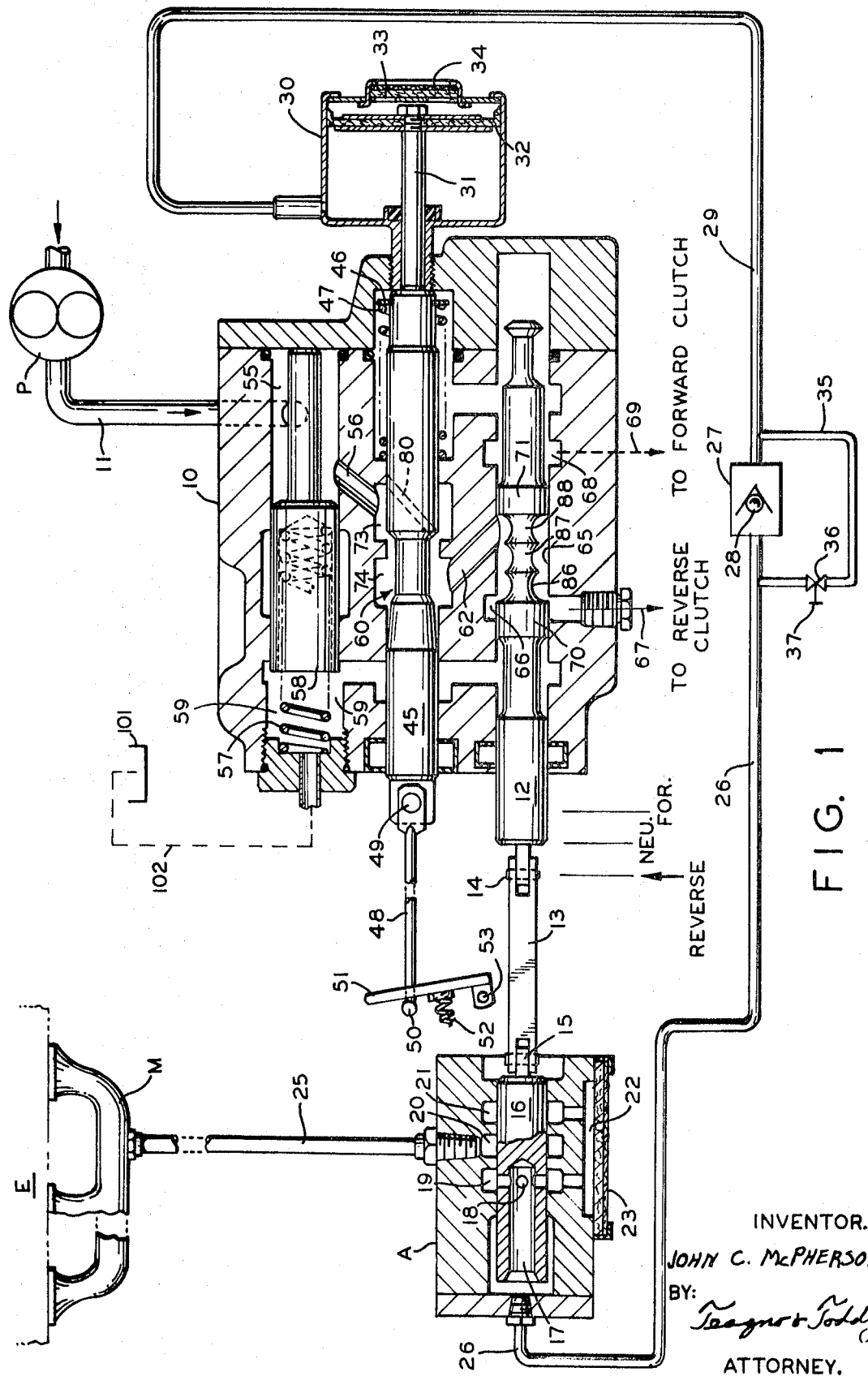
FIG. 1 is a schematic illustration of my invention with the directional valve in reverse drive position, the control valve being in a position to allow full application of a hydraulic pressure to the clutches.

In the drawings, the letter P in FIG. 1 designates a standard pump driven by an engine E having a manifold M. Engine E is the traction engine for the vehicle transmission of my invention. The valve assembly for controlling the hydraulic clutches of the hydraulic transmission is in a body 10 connected to the pump P by means of a passage 11. The directional valve is in the form of spool designated by numeral 12. By use of a link 13 connected at 14 to the valve 12, and at 15 to an actuator valve 16, it becomes possible to move the actuator valve 16 and the directional valve 12 together through the usual manually operated lever that is present in assemblies of the particular class.

The actuator valve 16 slides in a valve body A and is formed with a lateral passage 17 connected to a drilled vertical opening 18 that is adapted to be placed in communication with a port 19, a port 20, and a further port 21 in valve body A. It will be noted that in the reverse drive position of FIG. 1, the opening 18 is in communication with the port 19, the port 19 being in communication with a chamber 22 that through a screen 23 is in communication with the atmosphere. When the opening 18 is in communication with the port 20, it is then through a pipe 25 placed in communication with the engine manifold M, so that the vacuum developed at the manifold will operate effectively through the opening 18, the passage 17, to draw vacuum through a pipe 26 leading into valve body A. The pipe 26 is connected also to a valve body 27 in which is found a ball valve 28. The valve body 27 is in turn connected through a pipe 29 to a cylinder 30. Sliding in the cylinder 30, is a piston rod 31 fixed to a piston 32. One end of the cylinder 30 is formed with an air admitting opening 33 that is protected by a screen 34.

There is a bypass relatively to the passage formed by pipes 26 and 29. This bypass is through a pipe 35 arranged in bypass relation to the valve body 27, as clearly shown in FIGS. 1–3. A metering valve 36 is placed in the pipe 35 and is manually controlled at hand wheel 37 in order to control the volume of air that may flow through the pipe 35, all as will appear presently.

It will now be appreciated that when the actuator valve 16 is placed together with valve 12 in the reverse drive position of FIG. 1, passage 17 will be placed in communication with the atmosphere through opening 18, the chamber 22 and screen 23. Since the ball valve 28 prevents flow of air from the pipe 26 to the pipe 29 and to the cylinder 30, the flow of air to cylinder 30 will be through the volume control valve 36 as set by the manual device 37, the remainder of bypass pipe 35 and pipe 29. There will, therefore, be the same atmospheric pressure at both sides of piston 32, once flow through valve 36 is completed.

When the actuator valve 16 is in its forward position illustrated in FIG. 3, the passage 17 and opening 18 will be in communication with atmosphere through port 21, the chamber 22 and the screen 23. Again, atmospheric pressure will be established at both sides of piston 32. In other words, the condition within the cylinder 30 will be the same regardless of whether or not the actuator valve and the directional valve are in forward or reverse positions.

Figure 2:
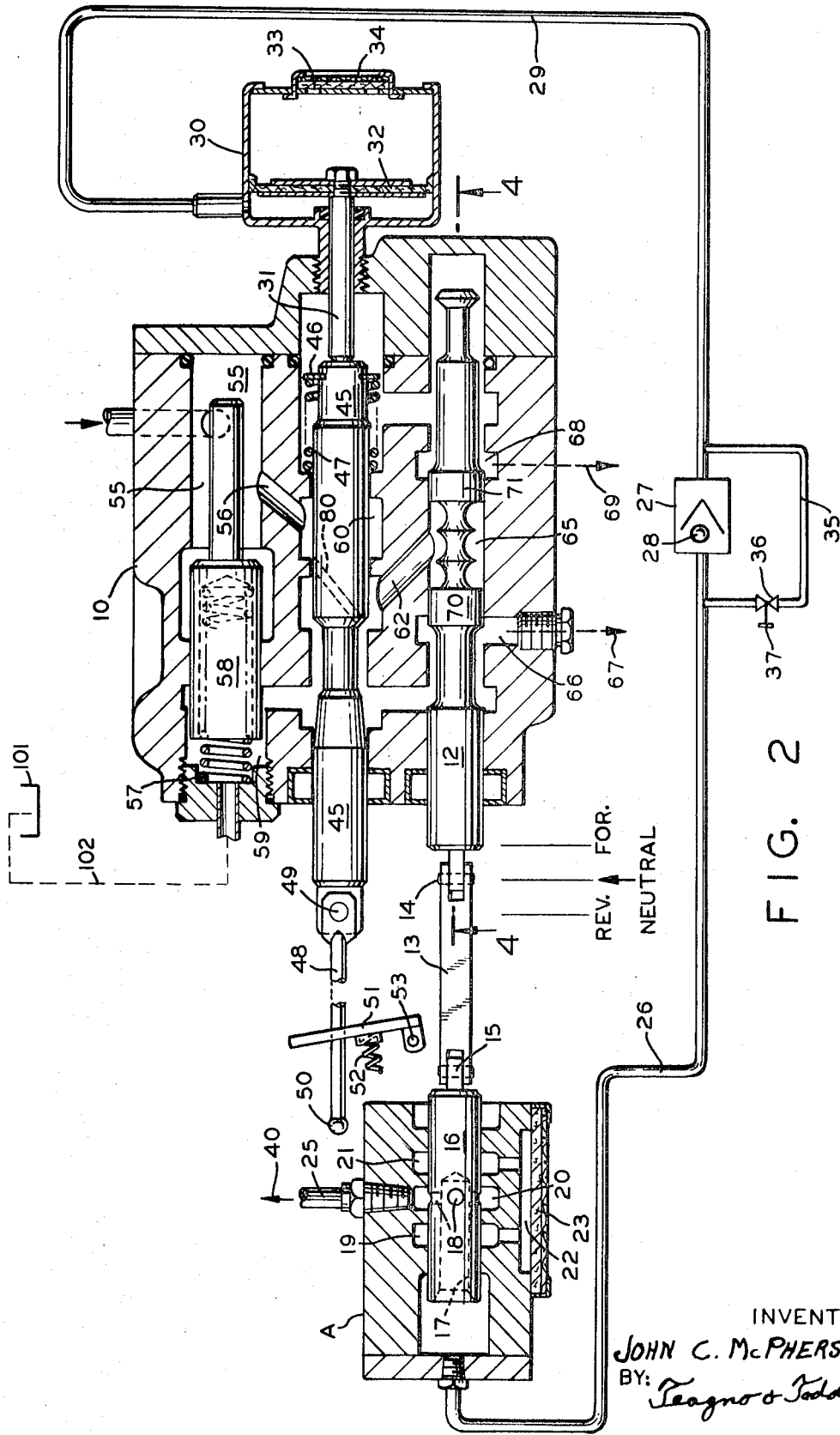
FIG. 2 is a view similar to FIG. 1, but showing the directional valve in a neutral position and with the control valve subjected to vacuum of the engine so as to relieve the clutches of their pressure.

With the actuator valve 16 in its neutral position illustrated in FIG. 2, the passage 17 and opening 18 will be in communication with the port 20, so that the vacuum of the manifold of the ENgine E will be applied at 25, as shown by the arrow 40. Ball valve 28 will be unseated by the vacuum as shown in FIG. 2, and the vacuum will be introduced by pipe 29 to the cylinder 30 at the left side of the piston 32. The atmospheric pressure established through the screen 34 and the opening 33 will obviously then push the piston 32 to the left into its position in FIG. 2, with results that will be set forth presently.

The valve body 10 contains, in addition to the valve spool 12, a further valve spool 45. At its right-hand end, as seen in the drawings, the valve spool 45 carries a spring disc 46, against which presses a spring 47 urging the valve 45 into its extreme right position shown in FIG. 1 against piston rod 31. Unless the valve 45 is moved by manual means in a manner to be set forth presently, or by the piston 32 and piston rod 31, as will also be described presently, it will be held by spring 47 in its position shown in FIG. 1.

Obviously, movement of the piston rod 31 from its position of FIG. 1 to its position of FIG. 2, will bring about movement of the valve 45 to the left against the pressure of the spring 47. The valve spool 45 may also be moved to the left through the intermediary of a rod 48 connected thereto at 49. Rod 48 has an abutment 50 whereby it may be moved through the intermediary of a treadle 51. The treadle 51 is normally pressed into a stop position illustrated in FIG. 1 by a spring 52. Obviously, depression of treadle 51 by its rotation counterclockwise from its position of FIG. 1 on its pivot at 53, will move the rod 48 to the left as illustrated in FIG. 3, all for a purpose to be set forth presently.

When the engine E is operated, the pump P is rotated and fluid will be drawn from a usual sump 101 through the pump and pipe 11 into the valve body 19. It will enter a chamber 55, and from chamber 55 it will be directed through a passage 56 into the cylindrical chamber 60, in which the valve spool 45 slides. A valve 58 slides in chamber 55 and is pressed by a spring 57 toward the right as seen in FIG. 1, the valve 58 constituting a pressure relief valve which is movable to the left from its position of FIG. 1 against the pressure of spring 57 in the event that pressure develops within the chamber 55 because of a malfunctioning of the valves or for other reasons which are well understood by those skilled in the art. Valve 58 effects communication between chamber 55 and a chamber 59 that connects to the sump 101 via line 102 in a standard manner, and it is to this sump that fluid will be directed in the event of the movement of the relief valve 58 against the pressure of the spring 57.

Fluid flows normally through the passage 56, as already set forth, into the cylindrical chamber 60 in which the valve spool 45 slides, and then through a passage 62 toward the cylindrical chamber 65 in which the valve spool 12 is adapted to slide. With the valve spool 12 in the position shown in FIG. 1, the fluid will flow into the cylindrical chamber 65 and then through the valve port 66 toward the reverse clutch. Since the clutch is entirely standard, and may be of any type, it is not shown, except by the arrow 67.

In FIG. 3, the directional valve spool 12 is shown in its forward position, and if valve spool 45 were in its position of FIG. 1, fluid would flow from the cylindrical chamber 65 through port 68 in the direction of the arrow 69 to the forward clutch. If the valve 12 is in a central or neutral position shown on FIG. 2, the port 66 and port 68 will each be shut off by lands 70 and 71 of the valve spool 12, and the flow of fluid under pressure to both clutches will be prevented, so that the transmission will be in neutral.

When the valve spool 45 is in its position of FIG. 1, in which position it is held by the pressure of the spring 47 against the piston rod 31, there will be full communication of fluid between the passage 56, the cylindrical chamber 60 and the passage 62, so that the positioning of the directional valve spool 12 in forward or reverse will mean that there will be full flow of fluid to the forward or reverse clutches. Let us assume now that the valve 12 is in forward drive position as illustrated in FIG. 3, and that it is desired to inch. In other words, it is the operator's wish to have the engine operate at a relatively high speed, but that the truck move forward at an exceedingly slow speed.

The driver, with the engine operating at relatively high speed, will move the treadle 51 from its dash and dotted line position in FIG. 3 to its full line position. This will cause the rod 48 to move to its position of FIG. 3. During this movement, a part 72 of the valve 45 will gradually close communication between a port 73 of the chamber 60 and a port 74 of the said chamber. At the same time the tapered portion 75 of the valve spool 45 will move into a position to cause communication between the chamber 60 and chamber 59, which, as will be remembered, is the chamber communicating with the sump 101 in the event the pressure relief valve 58 is actuated. It is obvious that when the part 72 of the spool 45 closes communication between the ports 73 and 74, fluid can only flow into the chamber 60 through the small bypass passage 80 in the spool 45, and relatively little fluid pressure is available to the clutches under the control of the directional valve 12. At the same time, as seen in FIG. 3, communication is established between the forward clutch and the chamber 59 to the sump 101 via line 102, through port 68, chamber 65, passage 62, chamber 60 and tapered surface 75 of valve body 45, so that pressure against the forward clutch is relieved. Of course, taper 75 is determined so that the control of the clutches exercised by the spool 45 under the manual positioning of the inching treadle 51 is as the designer requires. Actually, as will be appreciated, when the valve spool 45 is in the extreme left position shown in FIG. 3, the forward and reverse clutches should be relieved entirely of pressure. It is therefore possible to obtain effective inching through manipulation of the spool 45, as should now be rather apparent.

I shall now describe just what happens when the valve spool 12 is in one directional position and is moved toward a neutral position preliminary to being moved to a reverse directional position. In other words, I shall indicate just what happens when an attempt is made to plug the vehicle by moving from one directional position to a reverse position. In this case, I shall describe what happens when an attempt is made to move from a reverse directional position shown in FIG. 1 to a forward directional position.

Fluid flows under the control of spool 45 and directional spool 12 to the reverse clutch when the parts are positioned as in FIG. 1, as already set forth. Let us now assume that the operator wishes to reverse the drive and therefore moves the directional spool 12 first into its neutral position of FIG. 2. When he does this, he places the passage 17 and the opening 18 of valve 16 in a position in which the opening 18 communicates with the port 20 of valve body A. Now, the opening 18, instead of being in communication with the atmosphere as in FIG. 1, is in communication with the manifold M through the pipe 25. Therefore, the vacuum at the manifold acts to unseat the valve 28 so that air is partially exhausted from the cylinder 30 at the left of piston 32 through the pipe 29. Therefore, the atmospheric pressure exerted through the opening 33 is applied against the piston 32 moving the piston 32 into its position of FIG. 2. Now, the piston rod 31 has acted to move the valve spool 45 to the left to its position of FIG. 2, in which position flow of fluid to the chamber 65 of the valve body 10 is substantially reduced and substantially no fluid pressure is directed to the forward and reverse clutches.

Interestingly enough, because of the buildup of pressure within the valve body 10 through flow from pump P, the relief valve 58 will move to the left against the pressure of its spring 57 as seen in FIG. 2 so that fluid flowing from the pump will move toward the sump 101 through the chamber 59.

Let us now assume that the operator continues the movement of the actuator valve 16, moving it together with the valve spool 12 to the forward position of FIG. 3. As a matter of fact, the operator might consider moving the actuator valve back to its position of FIG. 1. In that event the apparatus would function in the same manner as though reversal were desired. Assuming that the actuator valve 16 is moved into the position of FIG. 3, it will be seen that the opening 18 is now in communication with the port 21, and therefore in communication with the chamber 22 and with the atmosphere through the screen 23. Air under atmospheric pressure is now allowed to flow through the screen 23, the chamber 22, and valve port 21, the opening 18, passage 17, the pipe 26, and toward the valve body 27. Because the ball valve 28 will be seated as shown in FIG. 3, there will be no flow possible through the valve body 27. Therefore, the air will be directed by the bypass pipe 35 under the control of the valve 36, as set by the manually operated part 37. The air as metered by the valve 36, will move through the pipe 29 and into the cylinder 30. With air thus introduced under atmospheric pressure into the cylinder 30, it is obvious that there will be a gradual balancing of pressures at the two sides of the piston 32, so that the spring 47 will be able to move the valve spool 45 from its position of FIG. 2 back toward its position of FIG. 1. This movement may be as slow as required by conditions and is determined by the valve 36. Thus, it will take some little time for the pressure to be equalized so that the piston 32 and its rod 31 may move from the position of FIG. 2 to the position of FIG. 1 to allow the valve spool 45 to move also from its position of FIG. 2 to its position of FIG. 1, in which full hydraulic pressure is applied against the clutches.

It will now be appreciated that when the directional valve spool 12 is in its reverse or forward drive position, the left hand side of piston 32 in the cylinder 30 is always in communication with atmospheric pressure. However, when the valve spool 12 is in its central or neutral position illustrated in FIG. 2, the cylinder at the left side of the piston 32 is in communication with a source of vacuum. Therefore, whenever the directional valve spool 12 is moved from a directional position into a neutral position, the clutches are relieved of all pressure. Moreover, when the valve spool 12 is then moved into a directional position, the flow of fluid tending to move the piston 32 from the position of FIG. 2 to the position of of FIG. 1 will be metered under the control of the valve 36 so that the application of fluid pressure to the forward or rearward directional clutches will be gradual and the clutches will not be applied so as to allow the truck to jerk into forward or reverse motion. As is also quite apparent, it is impossible to move from either directional position except by going into neutral position and placing the valve body 12 in neutral, at which time both clutches are relieved of fluid pressure and it is then necessary for the clutches to come under the control of the cylinder 30 and to be moved gradually into a clutching relationship so that the change in direction will obviously be controlled. In other words, plugging control is inherent in the invention.

It is further quite readily seen that through the simple provision of a treadle, it is possible for me to obtain inching control as I have already described in detail, through movement of the valve spool 45 by the treadle 51. This movement takes place exactly as under the control of the piston rod 31 and the piston 32, but at a speed determined by the operator.

In FIG. 4, I show a ball 85 that coacts with any one of three depressions 86, 87 and 88 of spool 12, to hold the spool 12 yieldingly in one of its three positions corresponding to forward, neutral or reverse. A spring 88a holds the ball in position, the spring acting against a headed screw 89, as is standard in the art.

In FIG. 5, I illustrate a modification of my invention, utilizing a part shown in FIG. 4. Thus, I substitute an electromagnet 90 for the various pipes and the actuator valve 16 of my preferred form. Then, the electromagnet 90 instead of engine vacuum is adapted to control the piston rod 31a and piston 32a which are the same generally as piston rod 31 in their action. Rod 31a traverses electromagnet 90 and functions as its armature. The valve spool 12, as shown in FIG. 4, is equipped with a contact portion 91, it being understood that the remainder of the valve surrounding the contact 91 will naturally be formed of a suitable insulating material 92. When the valve spool 12 is in its position of FIG. 4, which is its neutral position illustrated in FIG. 2, contact will be made between the contact portion 91 and a pair of wires 93 and 93a running from the valve body 10 to the electromagnet 90. Obviously, therefore, whenever the valve spool 12 is in its neutral position, the electromagnet 90 will be excited.

Cylinder 30a of the modification of FIG. 5 is similar to the cylinder 30 of the first modification, except that it has a metered passage for the admission of air, designated by reference numeral 94, and is equipped with a ball valve 95 that is normally seated against a passage 96, as is standard in the art. When the electromagnet 90 is excited, by movement of valve 12 to neutral, the piston 32a is moved to the left to its position of FIG. 5, and air will be allowed to escape from the cylinder 30a by the unseating of the ball valve 95. Obviously the piston rod 31a will act as does the piston rod 31 in the first modification, and the valve spool 45 will be moved to its position shown in FIG. 2. Now, should the valve spool 12 be placed in a forward or reverse drive position, the circuit established at 91 through the electromagnet 90 by wires 93 and 93l, will be broken, and the electromagnet 90 allows the piston rod 31a to move to the right from its position of FIG. 5 under the pressure of valve body 45 and its spring 47. The piston rod 31a and its piston 32a will now move to the right, allowing valve 45 to move also, but rather slowly, under the control of the metering valve 94. In other words, the metering valve 94 will act as does the valve 36, allowing a relatively slow application of hydraulic pressure to the forward and reverse clutches by permitting movement of the valve spool 45 as described with regard to the first modification.

I believe that those skilled in the art will now understand my invention rather clearly, and will appreciate its inherent merits.

I now claim:

1. A forward and reverse clutch system having a directional valve movable between a neutral position, and forward and reverse directional positions in which directional positions it directs fluid to forward or reverse clutches of an engine driven transmission, a control valve to control the fluid flowing to the forward and reverse clutches under the directional control of said directional valve, whereby to vary the pressure of fluid applied to said clutches, and vacuum actuated means for moving said control valve.

2. In the combination of claim 1, the feature that said vacuum is developed by said engine and that atmospheric pressure moves said control valve as the degree of vacuum increases, in a direction to decrease the flow of fluid to said clutches.

3. In the combination of claim 1, the feature that the application of said vacuum is controlled by movement of said directional valve.

4. In the combination of claim 3, the feature that the application of said vacuum is effected by movement of said directional valve to a neutral position.

5. In the combination of claim 4, the feature that said directional valve must be moved to neutral in order to shift it from one directional position to another, so that said vacuum must be applied during directional shifting.

6. In the combination of claim 5, the feature that the said vacuum will effect the movement of the control valve to a degree that will cause substantial release of the forward or reverse clutches.

7. In the combination of claim 2, the feature that an actuator valve movable with said directional valve controls the application of vacuum.

8. In the combination of claim 7, the feature that said actuator valve in one position subjects the control valve to said vacuum and in another position substitutes at least atmospheric pressure for said vacuum in order to move said control valve to increase fluid flow to said clutches.

9. In the combination of claim 8, the feature that the said substitution of at least atmospheric pressure is through a metering valve whereby said fluid flow will be increased gradually.

10. In the combination of claim 8, the feature that said actuator valve is moved coincidentally with said directional valve.

11. In the combination of claim 9, the feature that said actuator valve is moved coincidentally with said directional valve.

12. In the combination of claim 1, the feature that said control valve is movable also by an inching member to vary the pressure of fluid applied to said clutches.

13. In the combination of claim 6, the feature that said control valve is movable also by an inching treadle or the like whereby to effect decrease of fluid flow to said clutches when said directional valve is in a forward and in a reverse directional position.

14. In the combination of claim 1, the feature that a spring urges said control valve to a full flow position in which predetermined full flow of fluid to said clutches is effected, a piston or the like exposed at one side to atmospheric pressure pressing the piston against said control valve in a direction reverse to that in which it is urged by the force of said spring, a passage leading to the other side of said piston, means connecting said passage to a vacuum source, and an actuator valve for controlling the application of vacuum through said passage.

15. In the combination of claim 14, the feature that there is a bypass between said vacuum source and said passage whereby atmospheric pressure may be applied to both sides of said piston, and means whereby said actuator valve controls said bypass.

16. In the combination of claim 15, the feature that said bypass is metered so that atmospheric pressure therethrough is applied gradually.

17. In the combination of claim 16, the feature that said actuator valve is moved coincidentally with said directional valve and opens said bypass when said directional valve is in neutral position.

18. In the combination of claim 14, the feature that said control valve is movable by an inching treadle against the force of said spring whereby to effect decrease of fluid flow to said clutches when said directional valve is in a forward and in a reverse directional position.

19. A forward and reverse clutch system having a directional valve movable between a neutral position and forward and reverse directional positions in which directional positions it directs fluid to forward or reverse clutches of an engine driven transmission, and including a control valve to control the fluid flowing to the forward and reverse clutches under the control of the directional valve, whereby to vary the pressure of fluid applied to said clutches, the improvement that comprises operating means for moving said control valve in a direction to decrease the flow of fluid to said clutches whereby to effect slipping and substantial release of said clutches, and means whereby movement of said control valve in a reverse direction to increase the flow of fluid to said clutches, after release of said control valve from said operating means, is metered automatically so as to be gradual.

20. In the combination of claim 19, the feature that said operating means for moving the control valve to decrease fluid flow are rendered effective by movement of said directional valve to neutral position.

21. In the combination of claim 19, the feature that said operating means are a cylinder with a piston in said cylinder exposed at one side to atmospheric pressure and at the other side to pressure as determined by a passage from said cylinder communicating alternately with the atmosphere via a metering valve or with a vacuum source.

22. In the combination of claim 21, the feature that means operated coincidentally with said directional valve control the communication of said passage with the atmosphere and said vacuum source.

23. In the combination of claim 19, the feature that said control valve is movable also by an inching treadle or the like whereby to effect decrease of fluid flow to said clutches.

24. A forward and reverse clutch system having a directional valve movable between a neutral position, and forward and reverse directional positions, in which directional positions it directs fluid to forward or reverse clutches of an engine driven transmission, a control valve to control the flow of fluid under pressure to said clutches, and means actuated by movement of said directional valve for effecting movement of said control valve to control flow of fluid toward said clutches.

25. In the combination of claim 24, the feature that movement of said directional valve to neutral effects relatively swift movement of said control valve to decrease fluid flow and consequent substantial release of said clutches, and means whereby movement thereafter of said directional valve to a directional position effects relatively slow movement of said control valve in a direction to effect relatively slowly the increased application of fluid pressure to said clutches.

26. In the combination of claim 25, the feature that said control valve is movable also by an inching treadle or the like whereby to effect decrease of fluid flow to said clutches when said directional valve is in a forward and in a reverse directional position.

27. In the combination of claim 25, the feature that an electromagnet is energized by movement of said directional valve to neutral for moving said control valve to decrease fluid flow, and means for moving said control valve to increase flow when said electromagnet is deenergized.

28. In the combination of claim 27, the feature that said electromagnet is deenergized when said directional valve is moved to forward or reverse, and a dashpot or the like for controlling the movement of said control valve when it is released by deenergizing of said electromagnet.

29. In the combination of claim 19, the feature that said operating means is an electromagnet, and means for energizing and deenergizing said electromagnet.

30. In the combination of claim 29, the feature that said electromagnet when deenergized permits said control valve to move to permit full flow of fluid to said clutches, and a dashpot to slow down said movement.

31. In the combination of claim 30, the feature that a spring propels said control valve to full flow position.

* * * * *